(12) United States Patent
Chu (10) Patent No.: US 12,155,146 B2
(45) Date of Patent: Nov. 26, 2024

(54) LIFTING SOCKET

(71) Applicant: Zooey C. Chu, Caledonia, MI (US)

(72) Inventor: Zooey C. Chu, Caledonia, MI (US)

( * ) Notice: Subject to any disclaimer, the term of this patent is extended or adjusted under 35 U.S.C. 154(b) by 380 days.

(21) Appl. No.: 17/872,105

(22) Filed: Jul. 25, 2022

(65) Prior Publication Data
US 2024/0030644 A1 Jan. 25, 2024

(51) Int. Cl.
*H01R 13/46* (2006.01)
*A47B 83/04* (2006.01)
*H01R 13/447* (2006.01)

(52) U.S. Cl.
CPC ......... *H01R 13/447* (2013.01); *A47B 83/045* (2013.01); *A47B 2200/008* (2013.01)

(58) Field of Classification Search
CPC ................. A47B 2200/008; A47B 47/0082
See application file for complete search history.

(56) References Cited

U.S. PATENT DOCUMENTS

| | | | | |
|---|---|---|---|---|
| 3,433,886 A * | 3/1969 | Leonard | ................. | H02G 3/185 220/3.7 |
| 4,372,629 A * | 2/1983 | Propst | .................... | H02G 3/045 439/942 |
| 4,511,198 A * | 4/1985 | Mitchell | ................ | H02G 3/185 439/131 |
| 5,023,396 A * | 6/1991 | Bartee | .................... | H02G 3/185 439/131 |
| 5,351,173 A * | 9/1994 | Byrne | ..................... | A47B 21/06 362/418 |
| 5,954,525 A * | 9/1999 | Siegal | .................... | A47B 21/06 439/131 |
| 6,024,599 A * | 2/2000 | Stathis | ................... | H01R 13/60 439/535 |
| 6,028,267 A * | 2/2000 | Byrne | ................. | H01R 13/518 174/59 |
| 6,234,812 B1 * | 5/2001 | Ivers | ..................... | H01R 25/006 439/378 |
| 6,254,427 B1 * | 7/2001 | Stathis | ................... | H01R 13/60 439/535 |
| 7,674,119 B1 * | 3/2010 | McCarthy | .............. | A47B 21/00 439/131 |
| 8,475,186 B1 * | 7/2013 | Sikkema | ................ | H01R 13/74 439/502 |
| 8,598,453 B2 * | 12/2013 | Hsiao | ..................... | H02G 3/185 174/53 |

(Continued)

*Primary Examiner* — Neil Abrams
(74) *Attorney, Agent, or Firm* — Best & Flanagan LLP (57) ABSTRACT

A lifting socket comprises a housing including a chamber having an opening in an upper end thereof. A lifting base is disposed in the chamber and includes a casing and a transmission device for vertically moving the lifting base relative to the housing. A panel is disposed on top of the casing and includes sockets. A lid is connected to the lifting base and is disposed above the panel. A controller electrically connected to the transmission device can control vertical movement of the lifting base. When the lifting base is in an elevated position, the sockets can couple with electrical connecting devices. When the lifting base is in a lowered position, the lid is adjacent to or approximately at a level of a top end of the housing, and wires of the plurality of electrical connecting devices can extend through a gap between the lid and the opening.

10 Claims, 8 Drawing Sheets

(56) References Cited

U.S. PATENT DOCUMENTS

| | | | |
|---|---|---|---|
| 8,951,054 B2 * | 2/2015 | Byrne | H01R 35/04 |
| | | | 362/127 |
| 8,993,891 B2 * | 3/2015 | Drane | H05K 5/03 |
| | | | 174/152 G |
| 10,116,106 B2 * | 10/2018 | Byrne | A47C 21/003 |
| 10,231,539 B1 | 3/2019 | Lu | |
| 2024/0030644 A1 * | 1/2024 | Chu | H01R 13/447 |

* cited by examiner

LIFTING SOCKET

BACKGROUND OF THE INVENTION

The present invention relates to a socket and, more particularly, to a lifting socket that can ascend and descend.

The slots of currently available sockets for power supply and communication are directly exposed on a table surface, such that children may easily be injured when they insert fingers into the slots. Furthermore, dust or water tends to adhere to the exposed slots, causing electrical conduction or damage. Furthermore, currently available sockets occupy a considerable space, and the connecting wires electrically connected to the sockets are messy.

Current techniques related to lifting sockets are known, such as U.S. Pat. No. 10,231,539 which discloses a power-driven lifting socket. The socket can ascend and descend. When the socket ascends to an elevated position, a plug can be inserted into slots of the socket for use. The plug must be removed from the socket before the socket descends for storage. However, the slots are still exposed to the outside during use, leading to a security risk. Since the plug must be removed for storage, a user often forgets to descend the socket to the storage position, increasing the security risk.

BRIEF SUMMARY OF THE INVENTION

An objective of the present invention is to provide a lifting socket that can ascend and descend while providing improved use safety.

A lifting socket according to the present invention comprises a housing including a chamber having an opening in an upper end thereof. A lifting base is disposed in the chamber of the housing and includes a casing and a transmission device. The transmission device is disposed on the casing and is configured to actuate the lifting base to move relative to the housing in a vertical direction. A panel is disposed on top of the casing of the lifting base and substantially extends horizontally. The panel includes a plurality of sockets. A lid includes at least one connecting post connected to the lifting base. The lid is disposed above the panel and is substantially parallel to the panel. A spacing exists between the lid and the panel in the vertical direction. A width of the lid is smaller than a width of the housing. A controller is electrically connected to the transmission device and is configured to control vertical movement of the lifting base. When the lifting base is in an elevated position, the plurality of sockets of the panel is capable of coupling with a plurality of electrical connecting devices. When the lifting base is in a lowered position, the lid is adjacent to or approximately at a level of a top end of the housing, and wires of the plurality of electrical connecting devices is permitted to extend through a gap between the lid and the opening.

In an example, a lower inclined surface extends downward from an inner side of a top portion of the opening towards a center of the opening. An upper inclined surface extends downward from a peripheral edge of the lid towards a center of the lid and substantially parallel to the lower inclined surface.

In an example, a rack is disposed on an inner wall of the chamber of the housing and extends in the vertical direction. The transmission device includes a motor and a gear train drivenable by the motor. The gear train includes a gear meshed with the plurality of teeth of the housing.

In an example, an inner wall of the chamber of the housing includes a plurality of guiding grooves extending in the vertical direction. The casing of the lifting base includes a plurality of protrusions slidably received in the plurality of guiding grooves.

In an example, an ascent abutting portion and a descent abutting portion are disposed on an inner wall of the chamber of the housing. The lifting base further includes an upper positioning switch and a lower positioning switch. The upper positioning switch and the lower positioning switch are disposed on the casing and are in electrical connection with the controller. The upper positioning switch contacts with the ascent abutting portion when the lifting base reaches the elevated position, preventing further upward movement of the lifting base. The lower positioning switch contacts with the descent abutting portion when the lifting base reaches the lowered position, preventing further downward movement of the lifting base.

In an example, the controller is disposed on the lid and is in electrical connection with the lifting base. The controller includes a control button configured for controlling ascent and descent of the lifting base.

In an example, the panel is a cuboid and includes two ends spaced from each other along a longitudinal axis of the panel. The at least one connecting posts includes two connecting posts respectively connected to the two ends of the panel. The plurality of sockets includes a three-slot socket adjacent to one of the two ends of the panel. The three-slot includes a live wire slot, a neutral wire slot, and an earth wire slot. The earth wire slot is located between the one of the two ends of the panel and the live wire slot.

In an example, the housing is configured to be disposed on a board of a table. A lip is provided on an outer side of the opening and abuts a top face of the board. A clamping block is provided on the outer side of the housing and includes an abutting plate on an upper side thereof. The board is securely clamped between the lip of the housing and the abutting plate of the clamping block. The clamping block includes two coupling hooks on two sides thereof and located below the abutting plate. The clamping block further includes a positioning hook at a central portion thereof. The housing includes two coupling grooves corresponding to the two coupling hooks. The housing further includes a plurality of teeth disposed in the vertical direction and located corresponding to the positioning hook.

The control button can be used to move the lifting base. During movement of the lifting base, the protrusions of the lifting base move along the guiding grooves, improving the movement stability. After the lifting base reaches the elevated position, electrical connecting devices can be coupled with the sockets. Then, the control button can be used to move the lifting base and the panel to the lowered position, such that the lid is approximately at a level the same as the top face of the board. Wires of the electrical connecting devices can extend through the gap between the lid and the housing. The upper inclined surface of the lid and the lower inclined surface of the housing are inclined to avoid damage to the wires of the wire connecting devices resulting from significant bending of the wires extending outward to the board.

The lifting socket can be lowered while the electrical connecting device is coupled with an associated socket, and the lid covers the opening of the housing, avoiding a child from touching the slots of the socket and avoiding dust and water from entering the slots of the socket. Improved safety is, thus, provided.

The present invention will become clearer in light of the following detailed description of illustrative embodiments of this invention described in connection with the drawings.

DETAILED DESCRIPTION OF THE INVENTION

Figure 4:
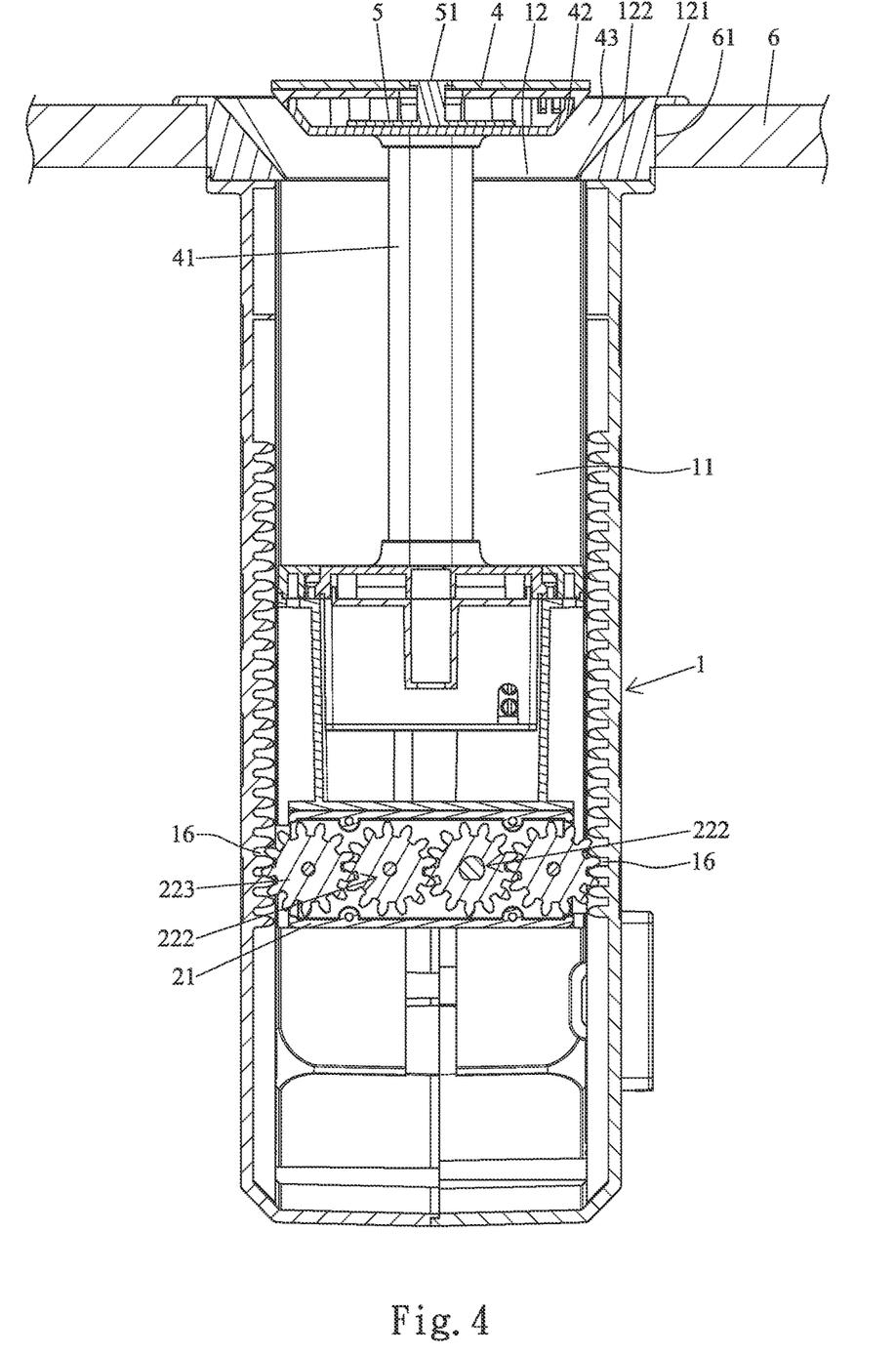
FIG. 4 is a cross sectional view of the lifting socket of the embodiment according to the present invention coupled with a board of a table.

With reference to FIGS. 1-5, a lifting socket of an embodiment according to the present invention comprises a housing 1, a lifting base 2, a panel 3, a lid 4, and a controller 5. The housing 1 is disposed below a board 6 of a table, as shown in FIG. 4. The housing 1 includes a chamber 11 in a central portion thereof. The chamber 11 has an opening 12 in an upper end thereof. A lip 121 is provided on an outer side of the opening 12 and abuts a top face of the board 6. A lower inclined surface 122 extends downward from an inner side of a top portion of the opening 12 towards a center of the opening 12. A clamping block 13 is provided on an outer side of the housing 1 and includes an abutting plate 131 on an upper side thereof. The board 6 is securely clamped between the lip 121 of the housing 1 and the abutting plate 131 of the clamping block 13. The clamping block 13 includes two coupling hooks 132 on two sides thereof and located below the abutting plate 131. The clamping block 13 further includes a positioning hook 133 at a central portion thereof. The housing 1 includes two coupling grooves 14 corresponding to the two coupling hooks 132. The housing 1 further includes a plurality of teeth 15 disposed in a vertical direction and located corresponding to the positioning hook 133. In an embodiment, each of two opposite inner walls of the chamber 11 of the housing 1 includes a rack 16 disposed thereon and extending in the vertical direction. Each of the two opposite inner walls of the chamber 11 of the housing 1 includes a plurality of guiding grooves 17 extending in the vertical direction 17 An ascent abutting portion 18 and a descent abutting portion 19 are disposed on the two opposite inner walls of the chamber 11 of the housing 1. In an alternative example, the ascent abutting portion 18 and the descent abutting portion 19 may be disposed on the same inner wall of the chamber 11. The housing 1 further includes a through-hole 191 through which wires (not shown) extends.

Figures 1, 1A, 1B, 1C, 1D:
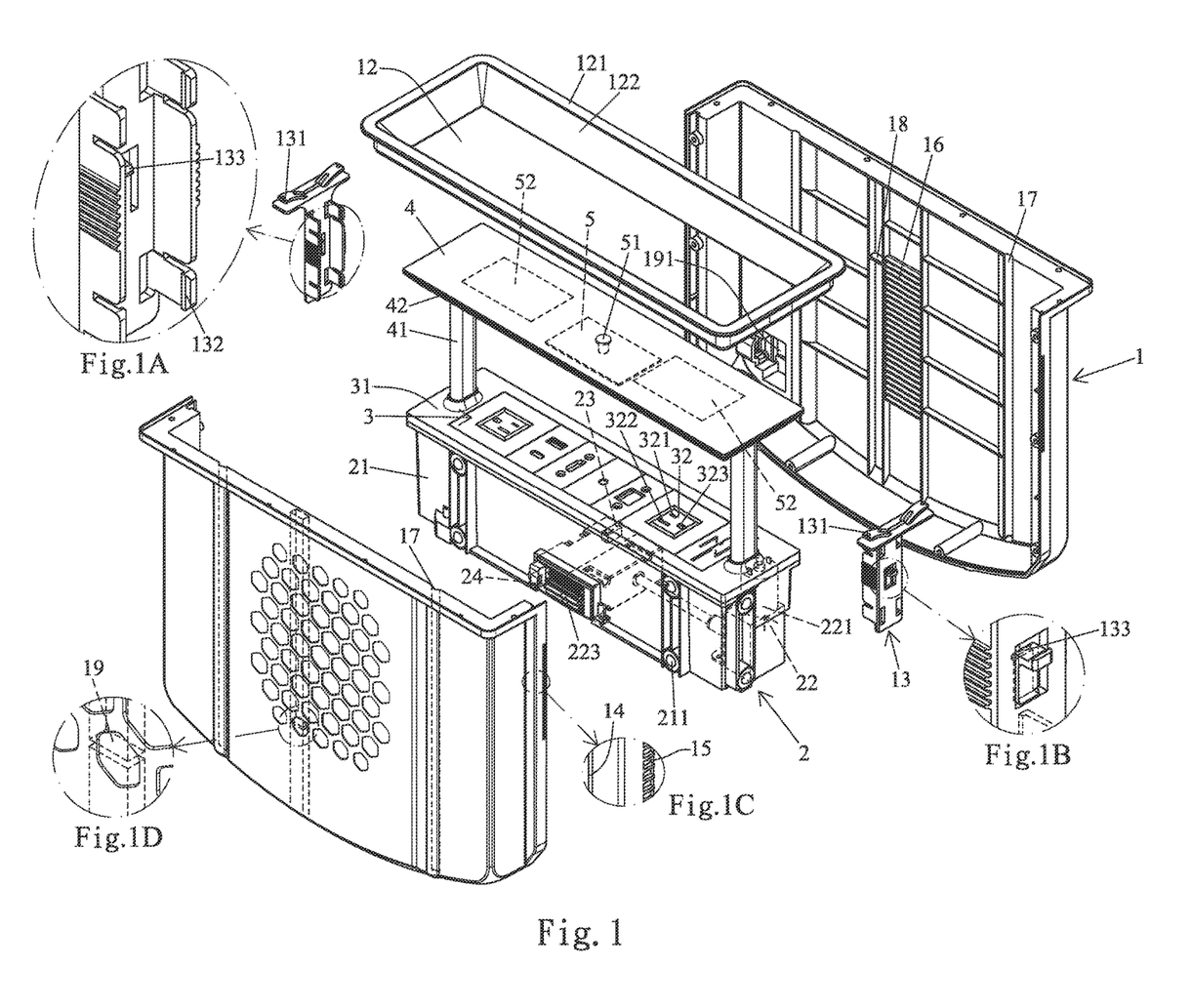
FIG. 1 is an exploded, perspective view of a lifting socket of an embodiment according to the present invention.
FIGS. 1A-1D are enlarged views of circled portions of FIG. 1.
Figure 2:
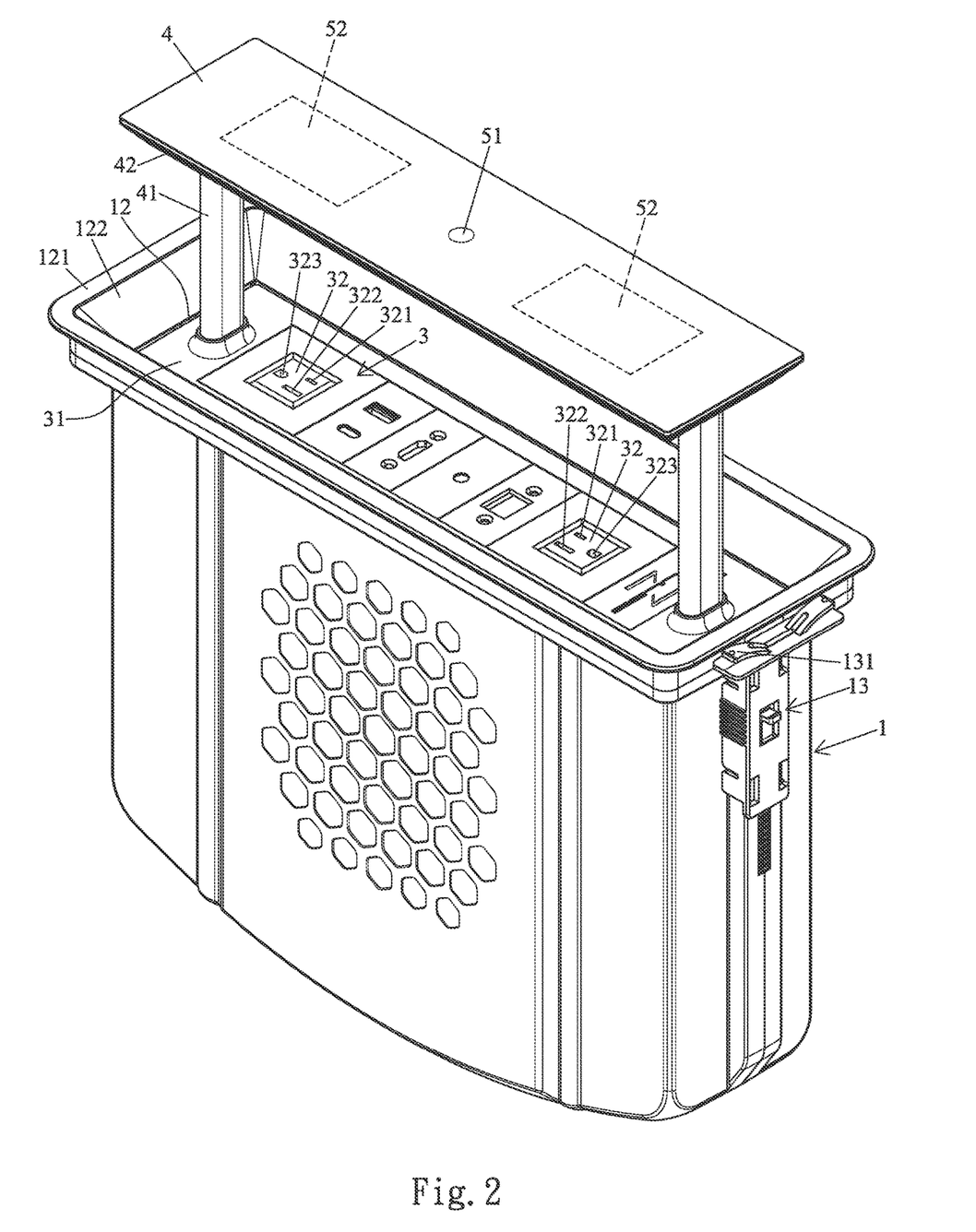
FIG. 2 is a perspective view of the lifting socket of the embodiment according to the present invention, with a lifting base in an elevated position.
Figure 3:
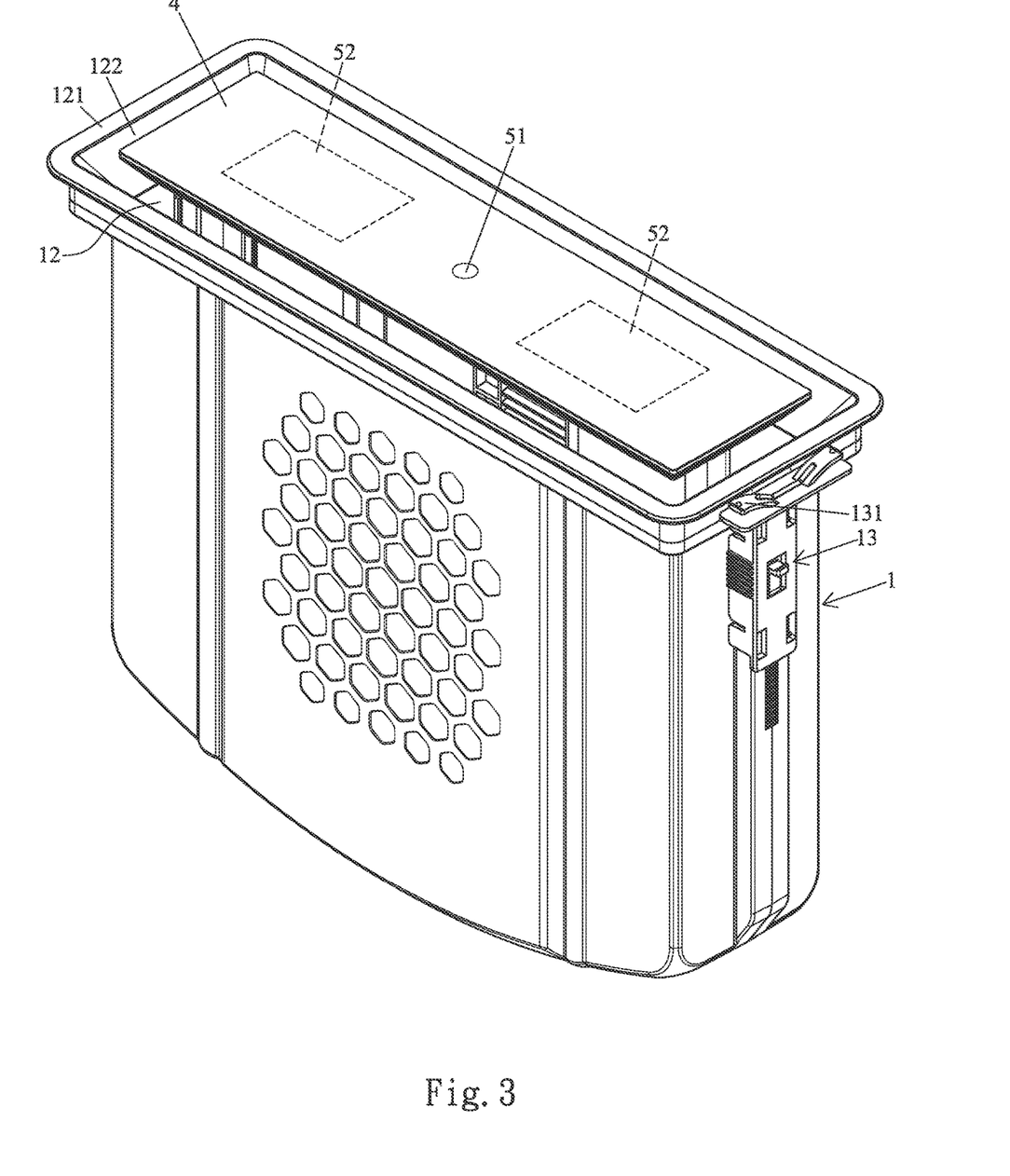
FIG. 3 is a perspective view of the lifting socket of the embodiment according to the present invention, with the lifting base in a lowered position.
Figure 5:
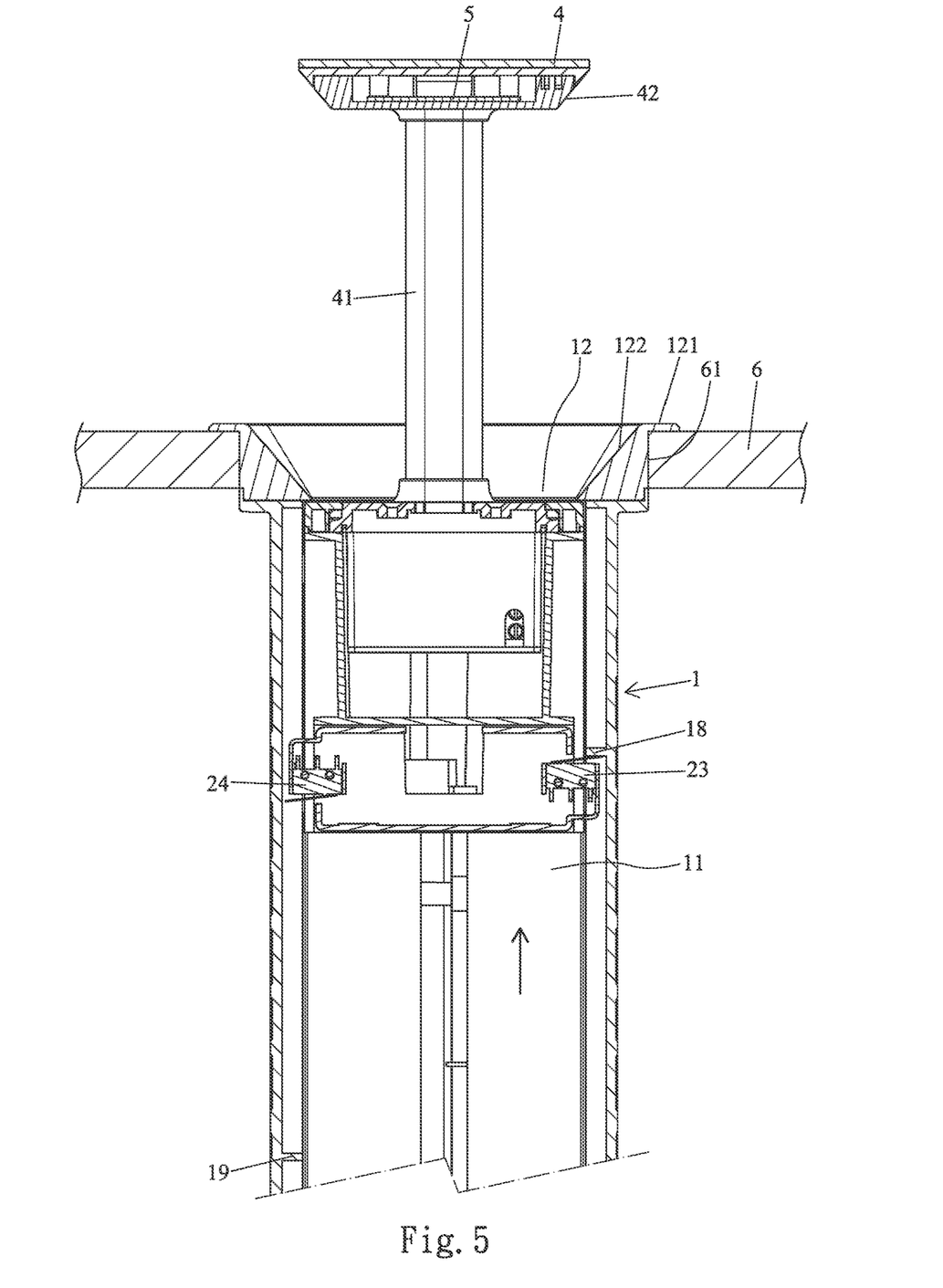
FIG. 5 is a cross sectional view of the lifting socket of the embodiment according to the present invention, with the lifting base in the elevated position.

A lifting base 2 is disposed in the chamber 11 of the housing 1 and can move relative to the housing 1 in the vertical direction. The lifting base 2 includes a casing 21, a transmission device 22, an upper positioning switch 23, and a lower positioning switch 24. A width of the casing 21 is smaller than the opening 12 of the chamber 11 of the housing 1. The casing 21 includes a plurality of protrusions 211 slidably received in the plurality of guiding grooves 17. The transmission device 22 is disposed on the casing 21. The transmission device 22 includes a motor 221 and a gear train 222 drivenable by the motor 221. The gear train 222 includes two gears meshed with the two racks 16, respectively. Thus, rotation of the gears 223 can actuate the lifting base 2 to ascend or descend relative to the housing 1. In a case that only one rack 16 is provided on an inner wall of the housing 1, the gear train 222 may include only one gear 223 meshed with the rack 16. The upper positioning switch 23 and the lower positioning switch 24 are disposed on the casing 21 and are in electrical connection with the controller 5. The upper positioning switch 23 contacts with the ascent abutting portion 18 when the lifting base 2 reaches the elevated position, preventing further upward movement of the lifting base 2. The lower positioning switch 24 contacts with the descent abutting portion 19 when the lifting base 2 reaches the lowered position, preventing further downward movement of the lifting base 2.

The panel 3 is disposed on top of the casing 21 of the lifting base 2 and substantially extends horizontally. In this embodiment, the panel 3 is a cuboid and includes two ends 31 spaced from each other along a longitudinal axis of the panel 3. The panel 3 includes a plurality of sockets 32 each of which may be in the form of a three-slot socket, a USB socket, a HDMI socket, a type-C socket, or a sockets of any other type. Each socket 32 can be connected with an external corresponding circuit by wires (not shown) extending through the through-hole 191 of the housing 1. In this embodiment, two three-hole sockets are respectively disposed adjacent to the two ends of the panel 3. Each three-hole socket includes a live wire slot 321, a neutral wire slot 322, and an earth wire slot 323. The earth wire slot 323 of each three-hole socket is located between a respective end 31 of the panel 3 and the live wire slot 321.

The lid 4 is disposed above the panel 3 and is substantially parallel to the panel 3. In this embodiment, the lid 4 includes two connecting posts 41 connected to the two ends 31 of the panel 3. A spacing exists between the lid 4 and the panel 3 in the vertical direction. Each connecting post 41 is hollow, and wires (not shown) can extend through the connecting post 41. A width of the lid 4 is greater than a width of the panel 3 and is smaller than the width of the opening 12 of the housing 1. Furthermore, an upper inclined surface 42 extends downward from a peripheral edge of the lid 4 towards a center of the lid 4 and is substantially parallel to the lower inclined surface 122. When the lifting base 2 is in the lowered position, the top end of the lid 4 is approximately at the same level as the top end of the housing 1. Furthermore, a gap exists between the lid 4 and the opening 12 of the housing 1.

The controller 5 is in electrical connection with the motor 221, the upper positioning switch 23, and the lower positioning switch 24 of the lifting base 2 and can control ascent and descent of the lifting base 2. The controller 5 can be disposed on the lid 4 and is connected to wires (not shown) extending through the connecting posts 41 to thereby electrically connect with the lifting base 2. Furthermore, the controller 5 includes at least one control button 51 for controlling ascent and descent of the lifting base 2. Furthermore, when the lifting base 2 is subjected to an improper resistance during descent travel, the controller 5 can control the lifting base 2 to ascend.

The board 6 of the table includes a through-hole 61. The housing 1 is disposed in the through-hole 61 of the board 6, and the lip 121 abuts the top face of the board 6. The two coupling hooks 132 of the clamping block 13 couple with the two coupling grooves 14 of the housing 1. The positioning hook 133 engages with one of the plurality of teeth 15 at a proper height. Furthermore, the abutting plate 131 abuts a bottom face of the board 6. The board 6 is securely clamped between the abutting plate 131 of the clamping block 13 and the lip 121 of the housing 1, thereby securing the housing 1 to the board 6.

The control button 51 can be used to move the lifting base 2. The motor 221 of the transmission device 22 drives the gear 223 to rotate, causing ascent of the lifting base 2. During movement of the lifting base 2, the protrusions 211 of the lifting base 2 move along the guiding grooves 17, improving the movement stability. When the upper positioning switch 23 contacts with the ascent abutting portion 18, the controller 5 deactivates the motor 221 to stop the lifting base 2, and the panel 3 is at a level approximately the same as the top face of the board 6.

Figure 6:
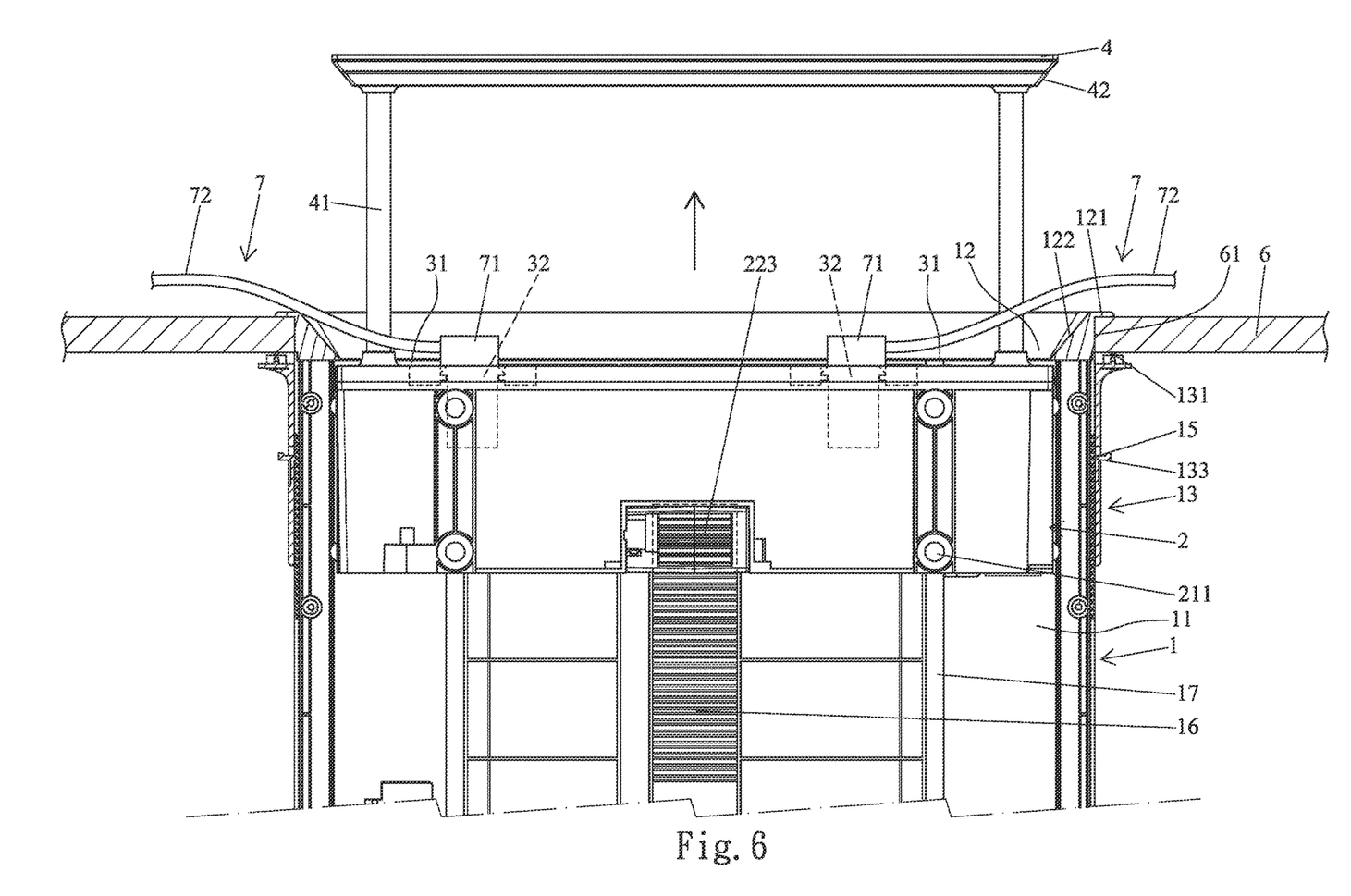
FIG. 6 is a cross sectional view illustrating insertion of an electrical connecting device into the lifting socket of the embodiment according to the present invention.
Figure 7:
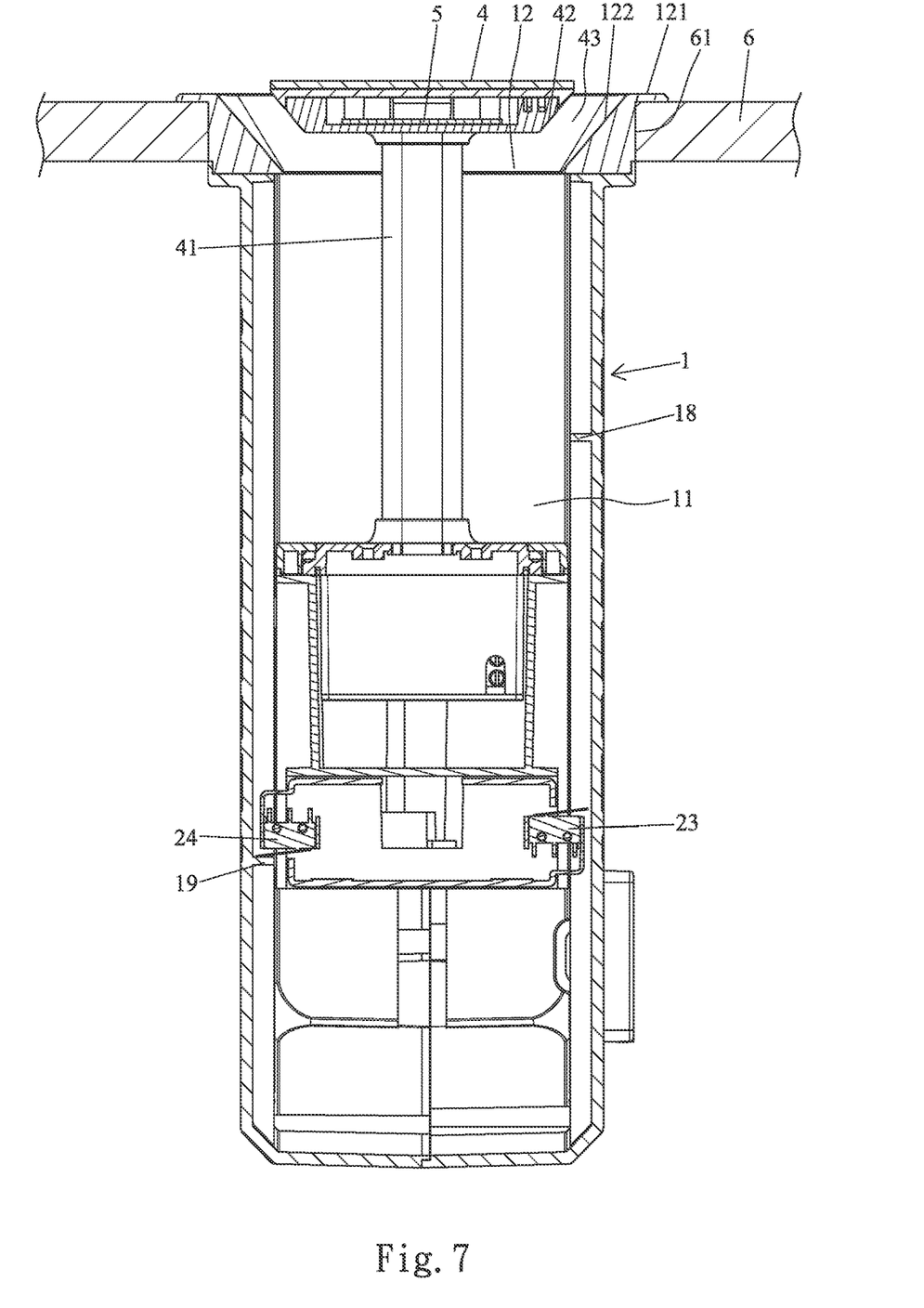
FIG. 7 is a cross sectional view of the lifting socket of the embodiment according to the present invention, with the lifting base in the lowered position after insertion of the electrical connecting device.
Figure 8:
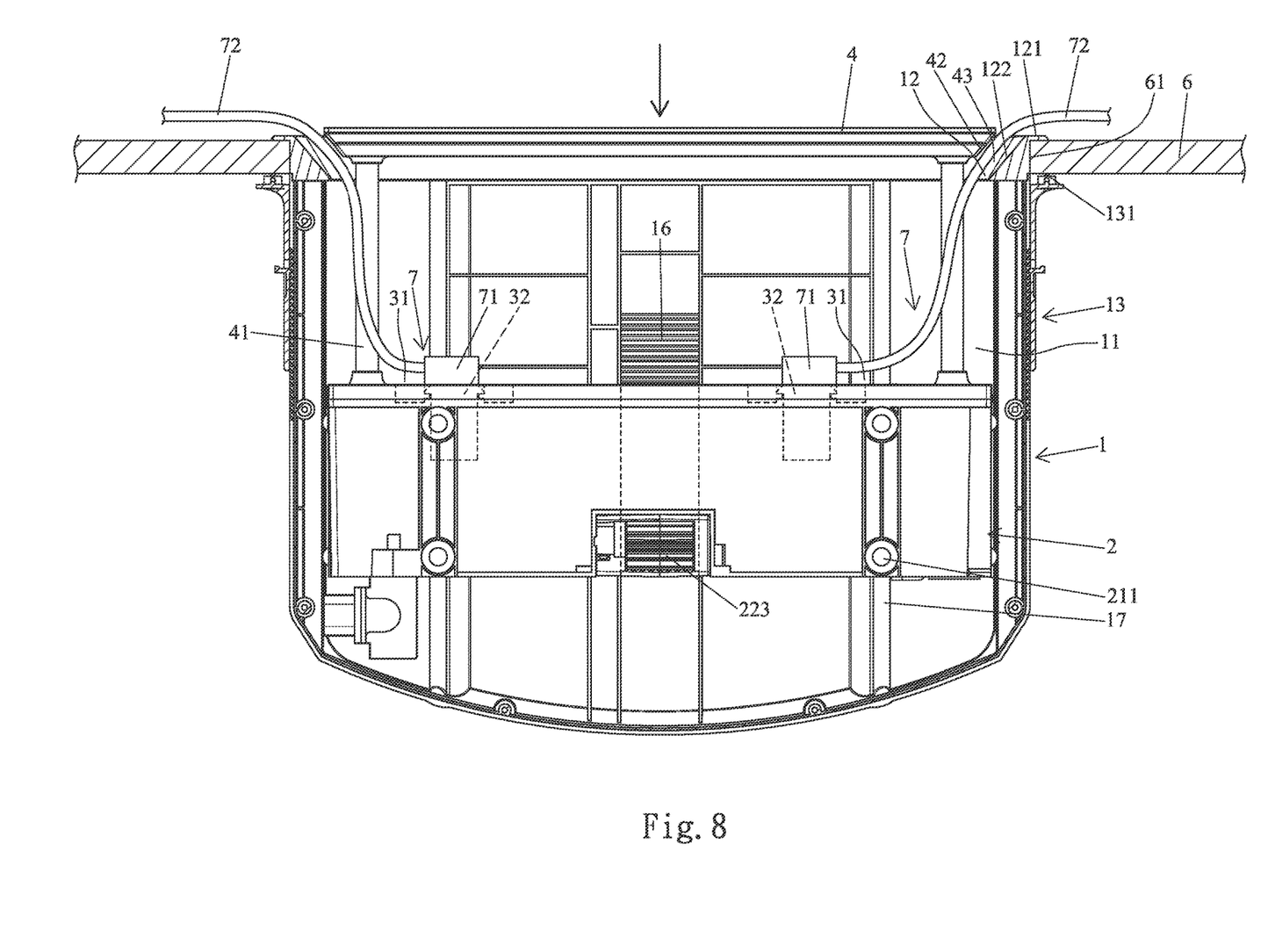
FIG. 8 is another cross sectional view of the lifting socket of the embodiment according to the present invention, with the lifting base in the lowered position after coupling with the electrical connecting device.

With reference to FIGS. 1 and 6, after the lifting base 2 reaches the elevated position, electrical connecting devices 7 can be coupled with the sockets 32. With reference to FIGS. 1, 7, and 8, the control button 51 can be used to actuate the transmission device 22 to thereby lower the lifting base 2 and the panel 3. When the lower positioning switch 24 contacts with the descent abutting portion 19, the lifting base 2 stops. The lid 4 is approximately at a level the same as the top face of the board 6. Wires 72 of the electrical connecting devices 7 can extend through the gap 43 (which is wide enough) between the lid 4 and the housing 1. The upper inclined surface 42 of the lid 4 and the lower inclined surface 122 of the housing 1 are inclined to avoid damage to the wires 72 of the wire connecting devices 7 resulting from significant bending of the wires 72 extending outward to the board 6. In a case that the plug 71 of an electrical connecting device 7 includes a T-shaped plug or other large plug (not shown), the plug 71 can be coupled with one of the sockets 32 adjacent to a respective end 31 of the panel 3, and the wire 72 of this electrical connecting device 7 can extend through the space above the respective end 31 (which is wide enough) of the panel 3, reducing bending of the end portion of the electrical connecting device 7 to thereby avoid damage to the electrical connecting device 7.

During the descent travel of the lifting base 2, when the lid 4 impinges a human finger or any other object (which generates a resistance), the controller 5 can detect the resistance through a change in the electric current or other mechanism and can then move the lifting base 2 upward, providing improved use safety.

The lifting socket can be lowered while the electrical connecting device 7 is coupled with an associated socket 32, and the lid 4 covers the opening 12 of the housing 1, avoiding a child from touching the slots of the socket 32 and avoiding dust and water from entering the slots of the socket 32. Improved safety is, thus, provided. Furthermore, the lid 4 may be flush with the top face of the board 6 when the lifting base 2 is in the lowered position.

The controller 5 disposed on the lid 4 may include a wireless charging module 52, such that a user may place a mobile phone on the lid 4 for charging purposes, providing an additional effect.

Although specific embodiments have been illustrated and described, numerous modifications and variations are still possible without departing from the scope of the invention. The scope of the invention is limited by the accompanying claims.

The invention claimed is:

1. A lifting socket comprising:
a housing including a chamber having an opening in an upper end thereof;
a lifting base disposed in the chamber of the housing and including a casing and a transmission device, wherein the transmission device is disposed on the casing and is configured to actuate the lifting base to move relative to the housing in a vertical direction;
a panel disposed on top of the casing of the lifting base and substantially extending horizontally, wherein the panel includes a plurality of sockets;
a lid including at least one connecting post connected to the lifting base, wherein the lid is disposed above the panel and is substantially parallel to the panel, and wherein a spacing exists between the lid and the panel in the vertical direction, and wherein a width of the lid is smaller than a width of the housing; and
a controller electrically connected to the transmission device and configured to control vertical movement of the lifting base, wherein when the lifting base is in an elevated position, the plurality of sockets of the panel is capable of coupling with a plurality of electrical connecting devices, and wherein when the lifting base is in a lowered position, the lid is adjacent to or approximately at a level of a top end of the housing, and wires of the plurality of electrical connecting devices is permitted to extend through a gap between the lid and the opening.

2. The lifting socket as claimed in claim 1, wherein a lower inclined surface extends downward from an inner side of a top portion of the opening towards a center of the opening, and wherein an upper inclined surface extends downward from a peripheral edge of the lid towards a center of the lid and substantially parallel to the lower inclined surface.

3. The lifting socket as claimed in claim 1, wherein a rack is disposed on an inner wall of the chamber of the housing and extends in the vertical direction, wherein the transmission device includes a motor and a gear train drivenable by the motor, and wherein the gear train includes a gear meshed with the plurality of teeth of the housing.

4. The lifting socket as claimed in claim 1, wherein an inner wall of the chamber of the housing includes a plurality of guiding grooves extending in the vertical direction, and wherein the casing of the lifting base includes a plurality of protrusions slidably received in the plurality of guiding grooves.

5. The lifting socket as claimed in claim 1, wherein an ascent abutting portion and a descent abutting portion are disposed on an inner wall of the chamber of the housing, wherein the lifting base further includes an upper positioning switch and a lower positioning switch, wherein the upper positioning switch and the lower positioning switch are disposed on the casing and are in electrical connection with the controller, wherein the upper positioning switch contacts with the ascent abutting portion when the lifting base reaches the elevated position, preventing further upward movement of the lifting base, and wherein the lower positioning switch contacts with the descent abutting portion when the lifting base reaches the lowered position, preventing further downward movement of the lifting base.

6. The lifting socket as claimed in claim 1, wherein the controller is disposed on the lid and is in electrical connection with the lifting base, and wherein the controller includes a control button configured for controlling ascent and descent of the lifting base.

7. The lifting socket as claimed in claim 1, wherein the width of the lid is greater than a width of the panel, and wherein a wireless charging module is disposed on the lid.

8. The lifting socket as claimed in claim 1, wherein the panel is a cuboid and includes two ends spaced from each other along a longitudinal axis of the panel, wherein the at least one connecting posts includes two connecting posts respectively connected to the two ends of the panel, wherein the plurality of sockets includes a three-slot socket adjacent to one of the two ends of the panel, wherein the three-slot includes a live wire slot, a neutral wire slot, and an earth wire slot, and wherein the earth wire slot is located between the one of the two ends of the panel and the live wire slot.

9. The lifting socket as claimed in claim 1, wherein the plurality of sockets of the panel includes a three-slot socket, a USB socket, a HDMI socket, and a type-C socket.

10. The lifting socket as claimed in claim 1, wherein the housing is configured to be disposed on a board of a table, wherein a lip is provided on an outer side of the opening and abuts a top face of the board, wherein a clamping block is provided on the outer side of the housing and includes an abutting plate on an upper side thereof, wherein the board is securely clamped between the lip of the housing and the abutting plate of the clamping block, wherein the clamping block includes two coupling hooks on two sides thereof and located below the abutting plate, wherein the clamping block further includes a positioning hook at a central portion thereof, wherein the housing includes two coupling grooves corresponding to the two coupling hooks, and wherein the housing further includes a plurality of teeth disposed in the vertical direction and located corresponding to the positioning hook.

* * * * *